(12) United States Patent
Watanabe

(10) Patent No.: US 7,603,021 B2
(45) Date of Patent: Oct. 13, 2009

(54) OPTICAL FIBER COMPONENT, OPTICAL WAVEGUIDE MODULE, AND MANUFACTURING METHOD

(75) Inventor: Shinya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/123,059

(22) Filed: May 6, 2005

(65) Prior Publication Data

US 2005/0254770 A1    Nov. 17, 2005

(30) Foreign Application Priority Data

May 12, 2004   (JP)   ............... 2004-142430
Apr. 20, 2005  (JP)   ............... 2005-122786

(51) Int. Cl.
    *G02B 6/00*    (2006.01)
(52) U.S. Cl. .......................... 385/137; 385/49
(58) Field of Classification Search .............. None
    See application file for complete search history.

(56) References Cited

U.S. PATENT DOCUMENTS 5,784,509 A * 7/1998 Yamane et al. ............... 385/49
6,222,967 B1 * 4/2001 Amano et al. ................ 385/49
6,241,399 B1 * 6/2001 Nobuhara .................... 385/84
6,363,201 B2 * 3/2002 Sherrer et al. .............. 385/137
6,874,950 B2 * 4/2005 Colgan et al. ................ 385/88
6,879,757 B1 * 4/2005 Zhou et al. ................... 385/49
2003/0133689 A1 * 7/2003 Jeong et al. ................ 385/137
2003/0142922 A1 * 7/2003 Dallas et al. ................. 385/83
2004/0165854 A1 * 8/2004 Niiyama et al. ............. 385/137
2004/0197067 A1 * 10/2004 Kumagai et al. ........... 385/137

FOREIGN PATENT DOCUMENTS

| JP | 63-311213  | 12/1988 |
| JP | 08-313756  | 11/1996 |
| JP | 2000-214352 | 8/2000 |
| JP | 2001-350051 | 12/2001 |
| JP | 2003-227962 | 8/2003 |

* cited by examiner

*Primary Examiner*—Tina M Wong
(74) *Attorney, Agent, or Firm*—Foley & Lardner LLP

(57) ABSTRACT

Optical fibers 301-308 are housed in V-grooves formed on a V-block 20 with end faces 311-318 flush with an end face 22 of the V-block 20. Therefore, when the optical fibers 301-308 are connected to optical waveguides, the V-block 20 suppresses the oscillation of the end faces 311-318 of the optical fibers 301-308. This structure increases the alignment precision and increases the intensity of the optical fibers 301-308.

10 Claims, 14 Drawing Sheets

FIG. 6
[2]
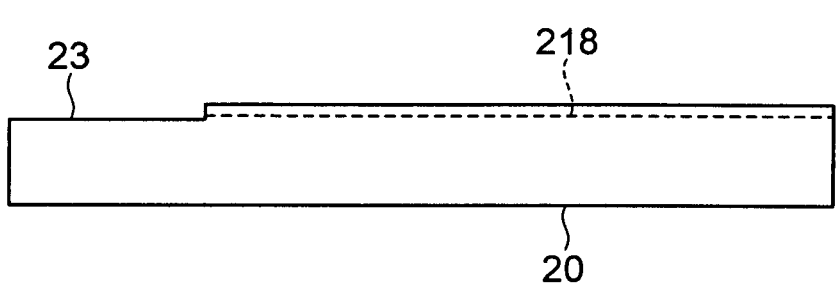
[3]
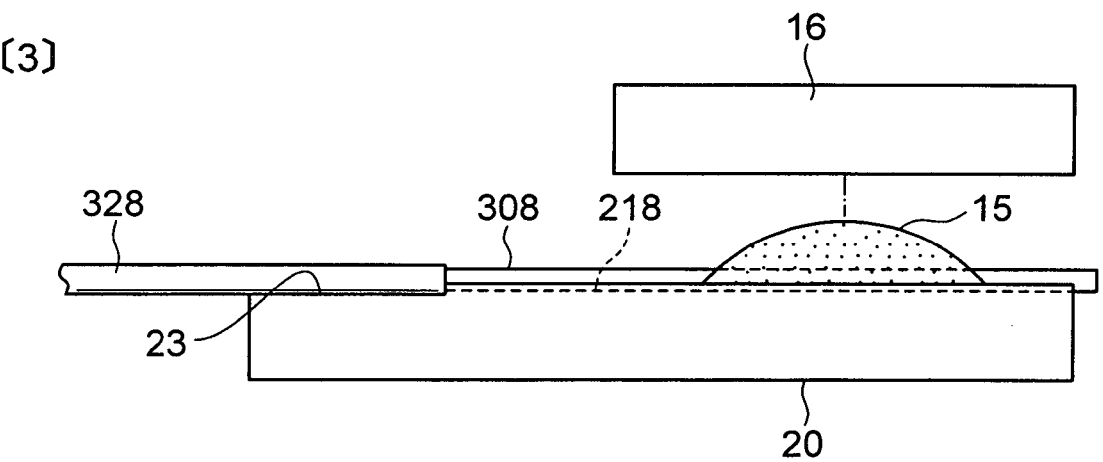
[4]
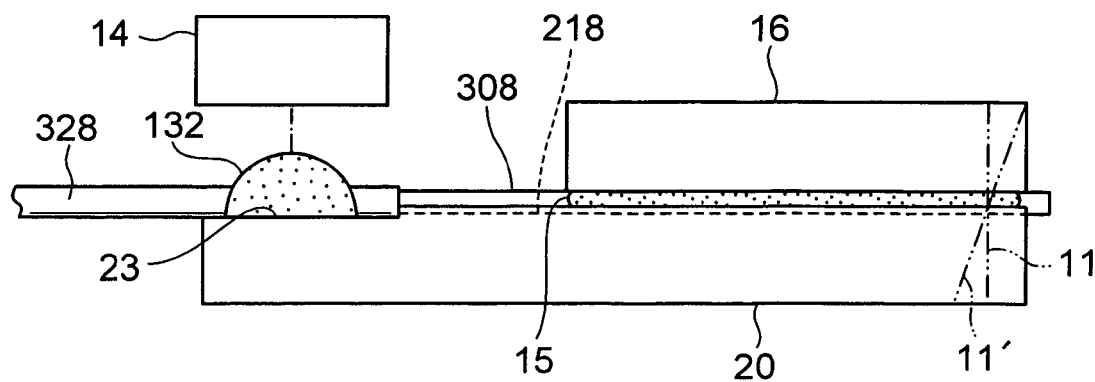

FIG. 8
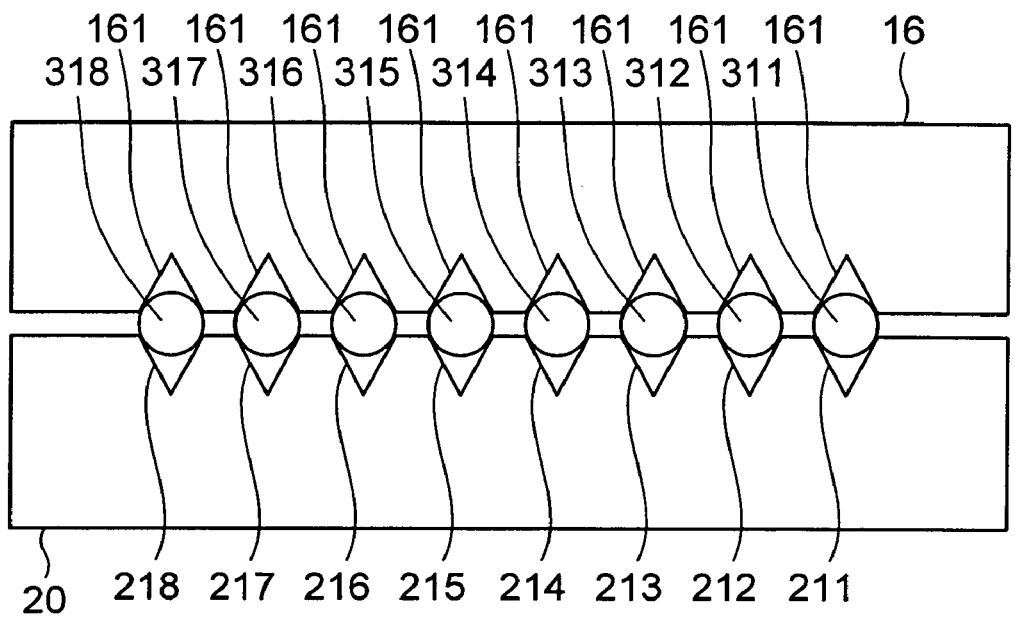
[2]
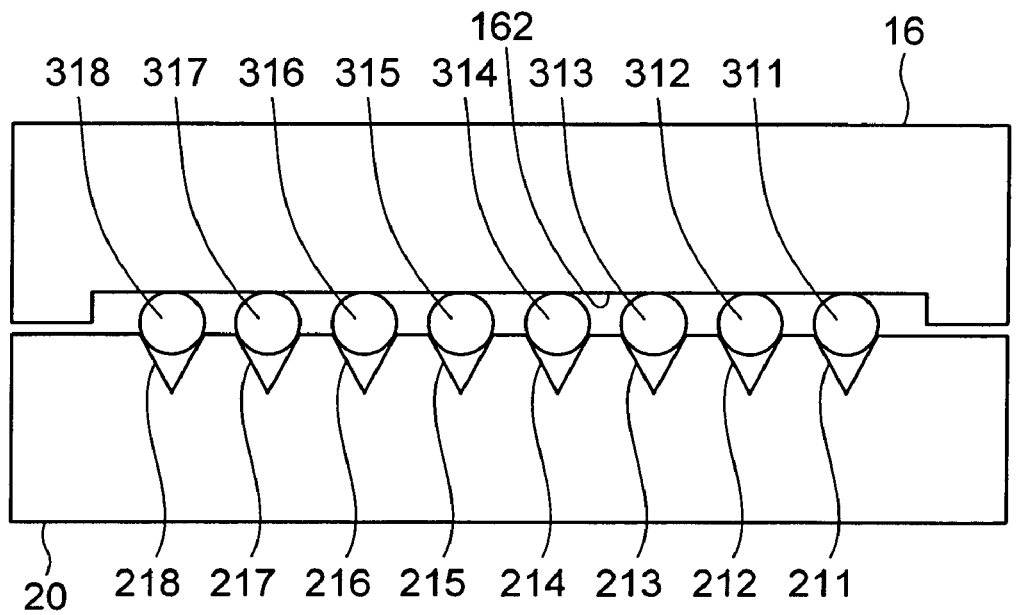

FIG. 10
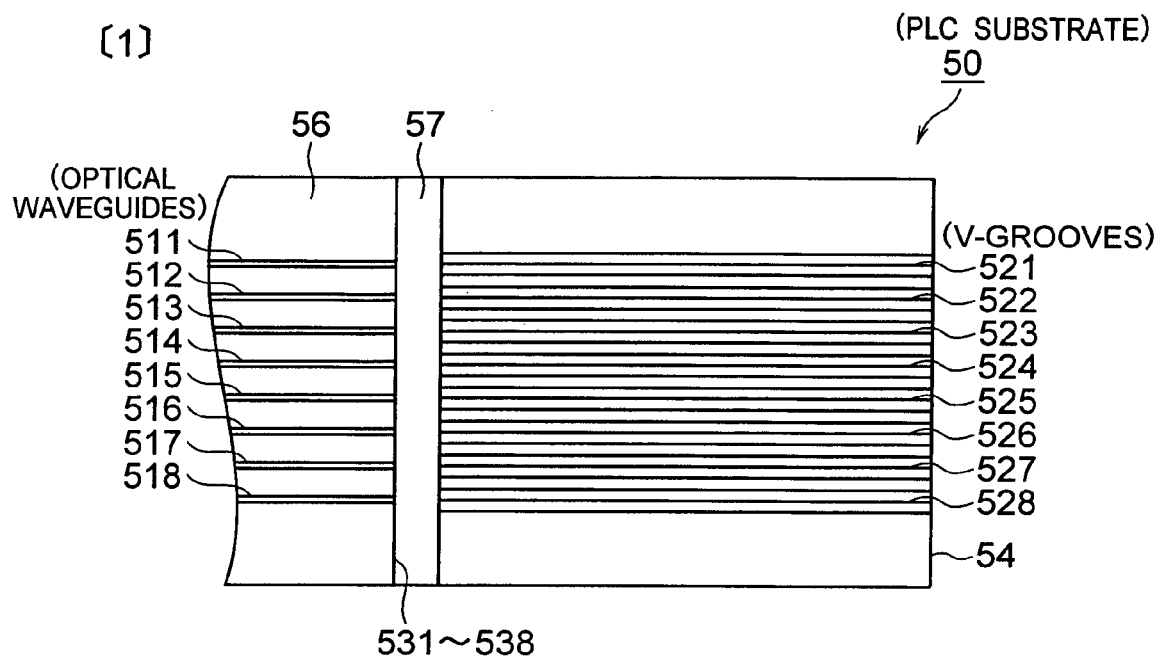
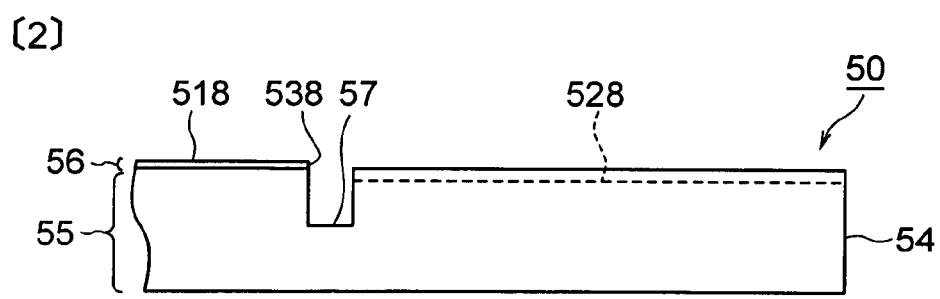
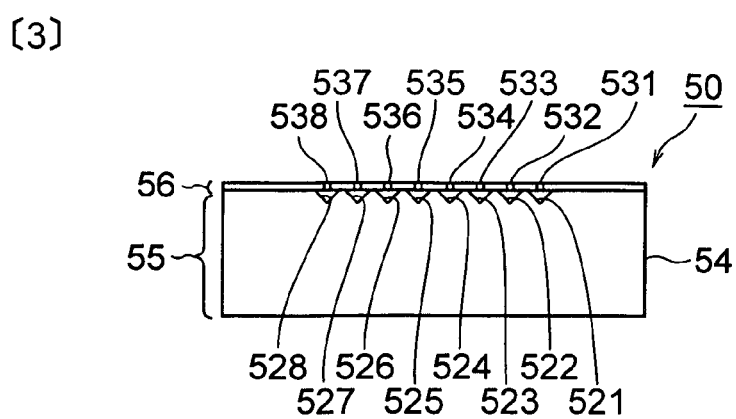

FIG.14
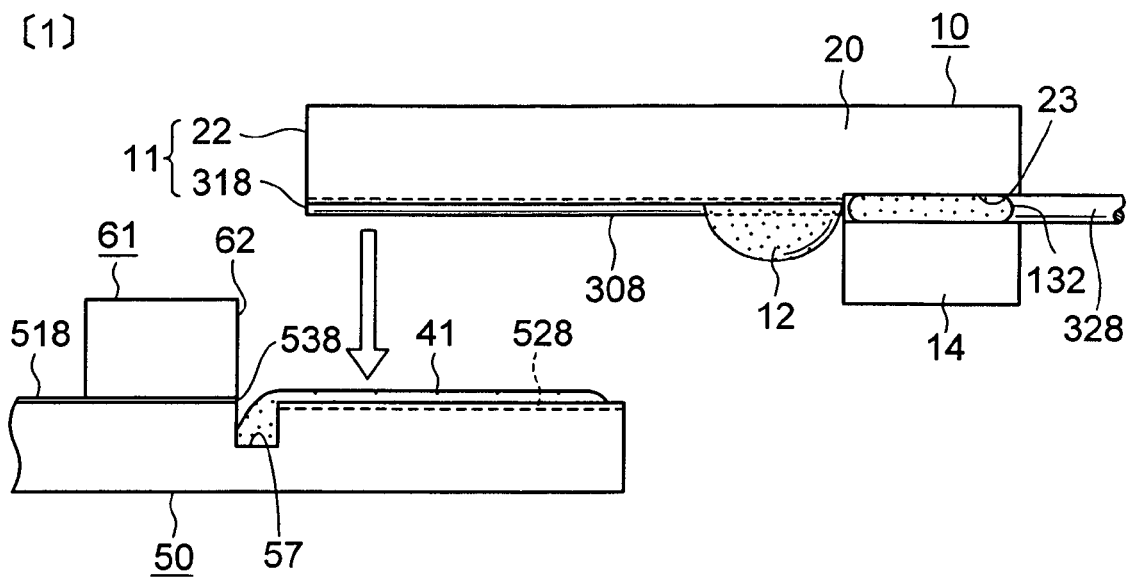
[1]
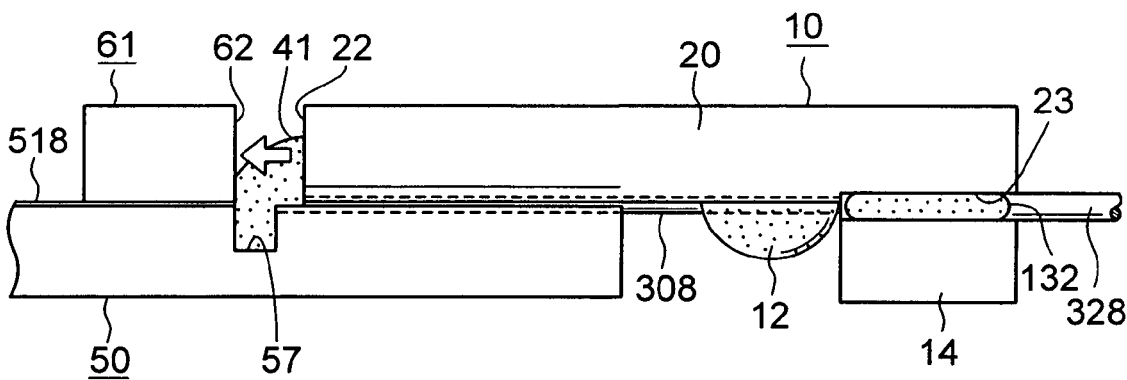
[2]
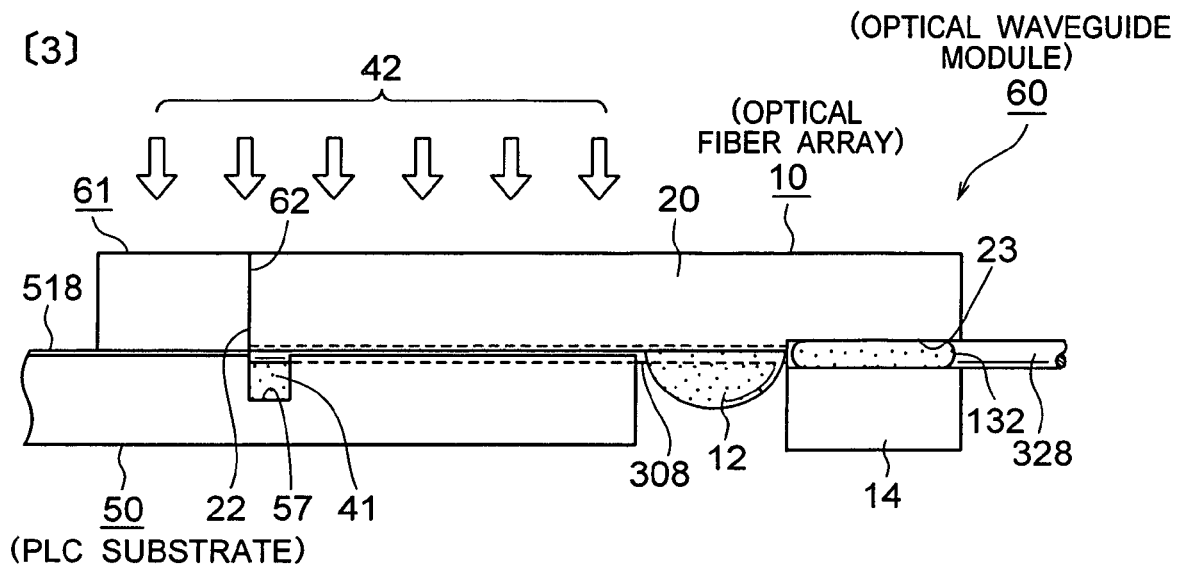
[3]

OPTICAL FIBER COMPONENT, OPTICAL WAVEGUIDE MODULE, AND MANUFACTURING METHOD

BACKGROUND OF THE INVENTION

1. Field of the Invention

The present invention relates to an optical fiber component advantageously applicable to the passive alignment technology.

2. Description of the Related Art

Recently, many optical components based on the PLC (Planar Lightwave Circuit) technology are widely used such as an AWG (Arrayed Waveguide Grating), a VOA (Variable Optical Attenuator), and an optical splitter. Those optical components, each with an interferometer or an optical branching unit within an optical circuit, can be combined to configure an optical filter or an optical attenuator. Thus, those optical components are important as key devices in an optical communication system.

To connect a PLC-based optical component to an optical fiber, the optical fiber is usually connected directly to the optical component with an adhesive. An appropriate adhesive, if used for this connection structure, would ensure good characteristics of connection between the optical component and the optical fiber and therefore gives a practical reliability. In a waveguide type optical device configured by combining an optical component and an optical fiber described above, the optical fiber is attached directly to the optical component. Therefore, this structure ensures reliable operation, because there is no air propagation between them nor are the optical characteristics changed by a shift in the optical axis between them.

The PLC-based waveguide type optical device described above, which is highly reliable and operates stably, requires precise optical coupling between the optical waveguide of an optical component and the optical fiber to a precision of sub-µm. The general method for this optical coupling is as follows. That is, the positions of the optical waveguide of the optical component and the optical fiber are optimally adjusted with an optical jig so that the optical coupling loss is minimized and, while holding them in that state, the optical waveguide of the optical component and the optical fiber are fixed with an optical adhesive and the like. Therefore, the task of coupling between the optical waveguide of the optical component and the optical fiber is complex, takes long, and increases the cost.

To solve this problem, the study is now under way for passive alignment that couples an optical fiber to an optical waveguide using a V groove with no need for optical axis alignment.

FIG. 1 and FIG. 2 show an optical waveguide module (hereinafter called a "first prior art") disclosed in Japanese Patent Application Laid-open No. 2003-227962.

As shown in FIG. 1 and FIG. 2, this optical waveguide module 80 is configured as an optical splitter comprising a V-groove substrate 81, an optical waveguide substrate 86, and a multi-core tape fiber 91. As shown in FIG. 2(a) and FIG. 2(b), the optical waveguide substrate 86 has a single-core waveguide 88a at one end with a plurality of branching waveguides 88b branching from the single-core waveguide 88a. The optical waveguide substrate 86 has alignment marks 90 in the four corners, one for each. The end face 87 of the optical waveguide substrate 86, the end face of the single-core waveguide 88a, an end face 89, and the end faces of the plurality of branching waveguides 88b are all cut obliquely.

The V-groove substrate 81 has a concave portion 83 thereon for housing the optical waveguide substrate 86 and, across the concave portion 83, one V-groove 82 and a plurality of V-grooves 84 are formed on either side. The V-groove substrate 81 has alignment marks 85 for alignment with the optical waveguide substrate 86.

The multi-core tape fiber 91 has the number of optical fibers 92 corresponding to the number of branching waveguides 88b of the optical waveguide substrate 86, and the end faces of the optical fibers 92 are cut obliquely.

The optical waveguide module 80 is assembled as follows. First, the optical waveguide substrate 86 is glued and fixed to the concave portion 83 of the V-groove substrate 81 using the alignment marks 85 and 90. With an optical fiber (not shown) installed in the V-groove 82 of the V-groove substrate 81, the core of this optical fiber is aligned with the core of the single-core waveguide 88a of the optical waveguide substrate 86. At the same time, with the oblique end face of the optical fiber not shown pushed against the oblique end face of the single-core waveguide 88a, the optical fiber not shown is coupled to the single-core waveguide 88a and the optical fiber not shown is held in the V-groove 82 of the V-groove substrate 81.

Similarly, with the optical fibers 92 of the multi-core tape fiber 91 installed in the V-grooves 84 of the V-groove substrate 81, the cores of the optical fibers 92 are aligned with the cores of the branching waveguides 88b of the optical waveguide substrate 86. At the same time, with oblique end faces 93 of the optical fibers 92 pushed against the oblique end faces of the branching waveguides 88b, the optical fibers 92 are coupled to the branching waveguides 88b and the optical fibers 92 are held in the V-grooves 84 of the V-groove substrate 81.

In the optical waveguide module 80 shown in FIG. 1 and FIG. 2, the optical fibers 92 are placed in the V-grooves 84 for passive alignment, and the oblique end faces 93 of the optical fibers 92 are connected to the oblique end face 89 of the optical waveguide substrate 86 to reduce the return loss.

FIG. 3 shows an optical waveguide module (hereinafter called a second prior art) disclosed in Japanese Patent Application Laid-open No. 8-313756.

As shown in FIG. 3, this optical waveguide module 100 comprises an optical waveguide unit 100B on a silicon substrate 101 and an optical fiber alignment unit 100A adjacent to the optical waveguide unit 100B. The optical waveguide unit 100B comprises a cladding 102 and cores 103 formed on the silicon substrate 101. The optical fiber alignment unit 100A has V-grooves 104 for fixing optical fibers, and the V-grooves 104 are formed on the silicon substrate 101 corresponding to the cores 103. The V-grooves 104 are formed on a part of the silicon substrate 101 through anisotropic etching. On the silicon substrate 101, a machined groove 107 is provided between the optical fiber alignment unit 100A and the optical waveguide unit 100B to physically separate them.

The optical waveguide module 100 shown in FIG. 3 is assembled by placing optical fibers 105 in the V-grooves 104, fixing the optical fibers 105 with a glass pressure plate 106 from above, and connecting the optical fibers 105 to the cores 103. An optical waveguide module similar to the one in the second prior art is disclosed also in Japanese Patent Application Laid-open No. 2001-350051.

However, the first prior art has the following problems.

(1) The oblique end faces 93 of the optical fibers 92, which are completely free end faces, sometimes oscillate in the V-grooves 84. The oscillation of the optical fibers 92 in the V-grooves 84 decreases the precision of alignment between the optical waveguides 88b and the optical fibers 92. In addition, if the oblique end faces 93 of the optical fibers 92 are free, the optical fibers 92 are easily broken if an unexpected force is applied to the optical fibers 92 during installation. Those problems are generated more often as the number of optical fiber cores increases.

(2) The need to align the optical waveguide substrate 86 with the V-groove substrate 81 using the alignment marks 85 and 90 complicates the manufacturing process and decreases alignment precision. The alignment, especially the height alignment between the V-groove substrate 81 and the optical waveguide substrate 86, must be precise to 1 μm or lower. However, even if UV photo-curing resin or heat-hardening resin is used for an adhesive for adhering the V-groove substrate 81 to the optical waveguide substrate 86, the height precision is affected by an order of several μm because the resin is hardened and cured. Therefore, as long as an adhesive is used for coupling the substrates 81 and 86, the alignment of the cores of the optical fibers 92 with the cores of the optical waveguides 88 is extremely difficult.

On the other hand, although the second prior art solves the problems described in (2) above, the problem (1) remains unresolved. That is, forming the optical fiber alignment unit 100A and the optical waveguide unit 100B on the same silicon substrate 101 eliminates the need for alignment between the optical fiber alignment unit 100A and the optical waveguide unit 100B. However, because the end faces of the optical fibers 105 are completely free, the end faces of the optical fibers 105 oscillate in the V-grooves 104 and therefore the alignment precision is decreased. In addition, when the end faces of the optical fibers 105 are free, the optical fibers 105 are easily broken when an unexpected force is applied to them during installation.

SUMMARY OF THE INVENTION

It is an object of the present invention to provide an optical fiber component and the like where passive alignment simpler and more precise than that in the prior arts is applied to the connection between optical fibers and optical waveguides.

To achieve the above object, an optical fiber component according to the present invention comprises a housing block having a groove on a surface thereof and an optical fiber housed in the groove, wherein an end face of the optical fiber and an end face of the housing block are in approximately the same plane and a side of the optical fiber that is housed in the groove but does not face the groove is exposed. A plurality of the grooves may be formed on the housing block, and a plurality of the optical fibers may be arranged on the housing block. The approximately same plane may be perpendicular to an optical axis of the optical fiber. The approximately same plane may also be tilted with respect to an optical axis of the optical fiber.

The optical fibers are housed in the grooves formed on the housing block, and the end faces are in the same plane as that of the end face of the housing block. That is, the whole part of the optical fibers is housed in the grooves including its end face. Thus, when the optical fibers and the optical waveguides are connected, the oscillation of the end faces of the optical fibers is suppressed by the grooves and, in addition, the tip area of the optical fibers is increased by the housing block. This configuration increases the alignment precision and makes the optical fibers more robust. At this time, the optical fibers exposed from the grooves are put on the guiding grooves of the optical waveguide substrate to ensure good alignment between the optical fibers and the optical waveguides.

The groove may comprise only a non-adhesive-fixing area in which the optical fiber is only inserted and, alternatively, the groove may be divided into an adhesive-fixing area in which the optical fiber is inserted and fixed by an adhesive and a non-adhesive-fixing area in which the optical fiber is only inserted. The optical fibers in the non-adhesive-fixing area are installed in the guiding grooves of the optical waveguide substrate. At this time, because there is no adhesive in the grooves, the optical coupling of the optical fibers in the non-adhesive-fixing area is good. On the other hand, when the whole part of the optical fibers is fixed in the grooves with an adhesive, the adhesive overflowed from the grooves solidifies and prevents the optical fiber component from being installed properly in the guiding grooves of the optical waveguide substrate, sometimes decreasing the alignment precision.

The optical fiber component may further comprise adhesive blocking unit provided at a boundary between the adhesive-fixing area and the non-adhesive-fixing area of the housing block for blocking the adhesive in the adhesive-fixing area from flowing into the non-adhesive-fixing area. Because the adhesive in the adhesive-fixing area remains a liquid or a fluid until it solidifies, the adhesive tends to flow into the non-adhesive-fixing area via the gap between the optical fibers and the grooves by the capillary phenomenon. To solve this problem, for example, a concave portion is formed in the housing block to provide a space large enough to prevent the capillary phenomenon. The adhesive blocking unit, which prevents the adhesive from flowing, can be composed of material that repels the adhesive (that is, material having the contact angle of 90 degrees or higher). This adhesive blocking unit is especially effective when the adhesive has a small contact angle with respect to the optical fibers and the grooves and has a low viscosity.

The optical fiber component may further comprise a holding block that works with the housing block to hold the optical fibers. In this case, the optical fibers can be fixed more firmly by the holding block.

The groove may be a V-groove. The cross section of an optical fiber is circular. Therefore, in the V groove whose cross section is V-shaped, the optical fiber is stabilized in the deepest position. Therefore, the alignment precision of the optical fibers increases.

A manufacturing method for the optical fiber component according to the present invention is a method for manufacturing the optical fiber component according to the present invention comprising the steps of housing the optical fiber in the groove on the housing block; temporarily fixing the optical fiber in the groove on the housing block using a temporary fixing block; putting an end face of the housing block and an end face of the optical fiber in approximately the same plane, both of the ends being temporarily fixed; and removing the temporary fixing block. The temporary fixing block is temporarily fixed by a wax. The temporary fixing block may also be temporarily fixed mechanically.

An optical waveguide module according to the present invention comprises the optical fiber component according to the present invention and an optical waveguide substrate having optical waveguides thereon wherein the optical fiber component and the optical waveguide substrate are optically connected. For example, the optical waveguide module is an optical splitter, an AWG, or a VOA. Guiding grooves are formed on the optical waveguide substrate, one of ends of the guiding grooves are opposed to end faces of the optical waveguides, and the other ends of the guiding grooves is on an end face of the optical waveguide substrate. The optical fibers are held between the guiding grooves and the grooves and, at the same time, end faces of the optical fibers are joined to the end faces of the optical waveguides. At this time, the guiding grooves may be V-grooves.

A first prior art, in which V-grooves and optical waveguides are formed on separate substrates, requires an additional step of adhering the optical waveguide substrate onto the V-groove substrate using the alignment marks. In contrast, the optical waveguide module according to the present invention has guiding grooves on the optical waveguide substrate on which optical waveguides are formed, making the manufacturing processing easier and increases the alignment precision. The reason is that a semiconductor process applicable to the micro fabrication, such as photo lithography and thin-film control, makes it possible to form guiding grooves on the optical waveguide substrate on which the optical waveguides are formed. In addition, in first and second prior arts (hereinafter called "prior art"), the optical fibers, even if placed in the V-grooves, oscillate in the V-grooves and this oscillation decreases the alignment precision. In addition, because only the end faces of the optical fibers are joined to the end faces of the optical waveguides, the optical fibers are easily damaged. In contrast, the optical waveguide module according to the present invention, which uses the optical fiber component according to the present invention, suppresses the oscillation of the optical fibers in the guiding grooves during the manufacturing process, thus increasing the alignment precision. Because the housing block increases the area in which the end faces of the optical fibers are joined to the end faces of the optical waveguides, the damage of the optical fibers during the manufacturing process is suppressed and the process yield is increased. In addition, because the optical fibers, including the shields thereof, are glued, fixed, and held in the housing blocks, the optical fibers become more robust against the external force. Another problem with the prior art is that, because the tips of a plurality of optical fibers are irregular, all the optical fibers cannot be completely connected to the end faces of the optical waveguides with the result that the optical coupling efficiency is decreased. In contrast, the optical waveguide module according to the present invention uses the optical fiber component according to the present invention where the tips of the plurality of optical fibers are ground. Therefore, all end faces of the optical fibers are in the same plane with an increased optical coupling efficiency.

The optical waveguide module according to the present invention may further comprise an abutment block that is provided on the optical waveguide substrate and has an abutment plane in the same plane as that of the end faces of the optical waveguides. At this time, the optical fibers are held between the guiding grooves and the grooves and, at the same time, the end faces of the optical fibers and an end face of the housing block are joined to the end faces of the optical waveguides and the abutment face of the abutment block, to be fixed. The end faces of the optical fibers and the end face of the housing block are joined not only to the end faces of the optical waveguides but also to the abutment face of the abutment block to further increase the strength.

In addition, the optical waveguide module according to the present invention may also be configured in such a way that the optical waveguide block and the housing block hold the optical fibers therebetween only with the guiding grooves and the grooves. In this case, the optical fibers do not oscillate in the guiding grooves and the grooves and, so, the optical fibers can be aligned more precisely. Holding the optical fibers only with the guiding grooves and the grooves would generate a gap between the optical waveguide block and the housing block.

A manufacturing method for the optical waveguide module according to the present invention is a method for manufacturing the optical waveguide module according to the present invention. The manufacturing method for the optical waveguide module according to the present invention comprises the steps of forming the optical waveguides and the guiding grooves on the optical waveguide substrate; installing the optical fiber component on the optical waveguide substrate to hold the optical fibers between the guiding grooves and the fixed grooves; and joining the end faces of the optical fibers to the end faces of the optical waveguides, while holding the optical fibers between the guiding grooves and the fixed grooves, and fixing the joined state.

The optical fiber component according to the present invention comprises the housing block on which grooves are formed, optical fibers housed in the grooves, and the plane created in such a way that the end faces of the optical fibers and the end face of the housing block are in approximately the same plane. When the optical fibers and the optical waveguides are connected, this configuration causes the grooves to suppress the oscillation of the end faces of the optical fibers for increasing the alignment precision and the optical fiber strength. Fixing only a part of the optical fibers in the grooves with an adhesive avoids a condition, in which an adhesive running over from the grooves prevents the optical fiber component from being properly installed in the guiding grooves on the optical waveguide substrate, which would occur when the whole part of the optical fibers is fixed in the grooves with an adhesive. In addition, the holding block provided in the adhesive-fixing area works with the holding block to hold the optical fibers more firmly. By forming the groove as V-shaped, the V-grooves also increase the optical fiber alignment precision because each optical fiber is stabilized in the deepest position in the groove.

The optical waveguide module according to the present invention has the guiding grooves on the optical waveguide substrate on which the optical waveguides are formed. This configuration eliminates the need for the step of adhering the optical waveguide substrate to the V-groove substrate using the alignment marks, thus simplifying the manufacturing process and increasing the alignment precision. The optical fibers are held between the fixed grooves of the housing block and the guiding grooves of the optical waveguide substrate, and the end faces of the optical fibers and the end faces of the optical waveguides are joined and fixed. This causes the grooves to suppress the oscillation of the optical fibers in the guiding grooves during the manufacturing process, increases the alignment precision, suppresses the damages of the optical fibers, and increases the process yield.

The optical fiber component according to the present invention comprises a housing block having grooves on its surface and optical fibers housed in the grooves, wherein the end faces of the optical fibers and the end face of the housing block are in approximately the same plane and the side of the optical fibers that are housed in the grooves but do not face the grooves is exposed. When the optical fibers are connected to the optical waveguides, the grooves suppress the oscillation of the end faces of the optical fibers and, therefore, the alignment precision, as well as the optical fiber strength, is increased.

BRIEF DESCRIPTION OF THE DRAWINGS

FIG. 4 is a top view, and FIG. 4 is a front view.

FIG. 6 is a front view of the optical fiber array in FIG. 4 during the manufacturing process with the process proceeding from FIG. 6 to FIG. 6.

FIG. 7 is a top view, and FIG. 7 is a front view.

FIG. 8 is a schematic cross section diagram taken on line V-V in FIG. 7, FIG. 8 shows a first example, and FIG. 8 shows a second example.

FIG. 9 is a top view, and FIG. 9 is a front view.

FIG. 10 is a diagram showing a PLC substrate of an optical waveguide module in a first embodiment of the present invention, FIG. 10 is a top view, FIG. 10 is a front view, and FIG. 10 is a right side view.

FIG. 14 is diagram showing a front view of an optical waveguide module in a second embodiment of the present invention and its manufacturing method with the process proceeding from FIG. 14 to FIG. 14.

DESCRIPTION OF THE PREFERRED EMBODIMENTS

Next, embodiments of the present invention will be described in detail by referring to the attached drawings.

Figure 4:
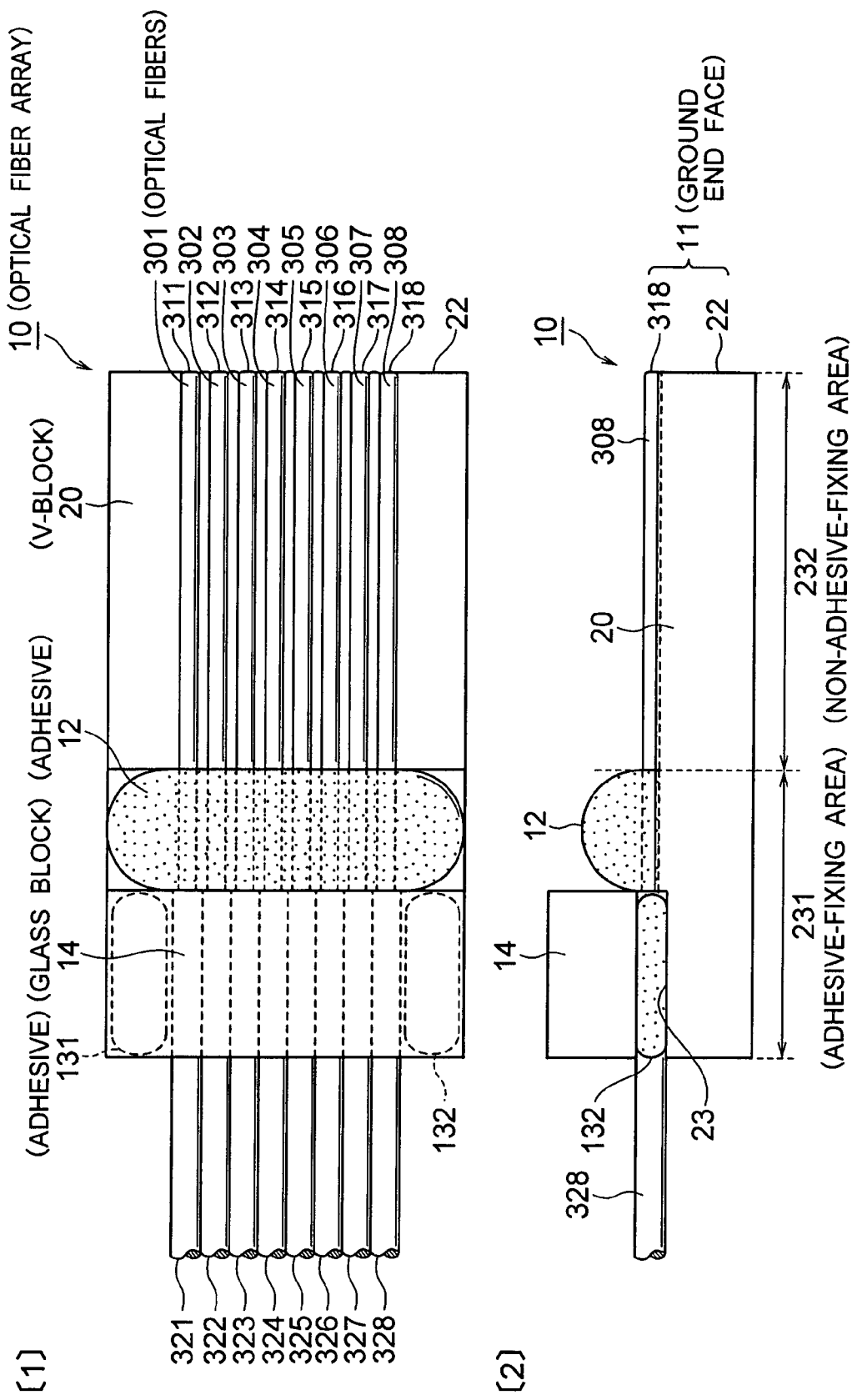
FIG. 4 is a diagram showing a first embodiment of an optical fiber array of the present invention.
Figure 5:
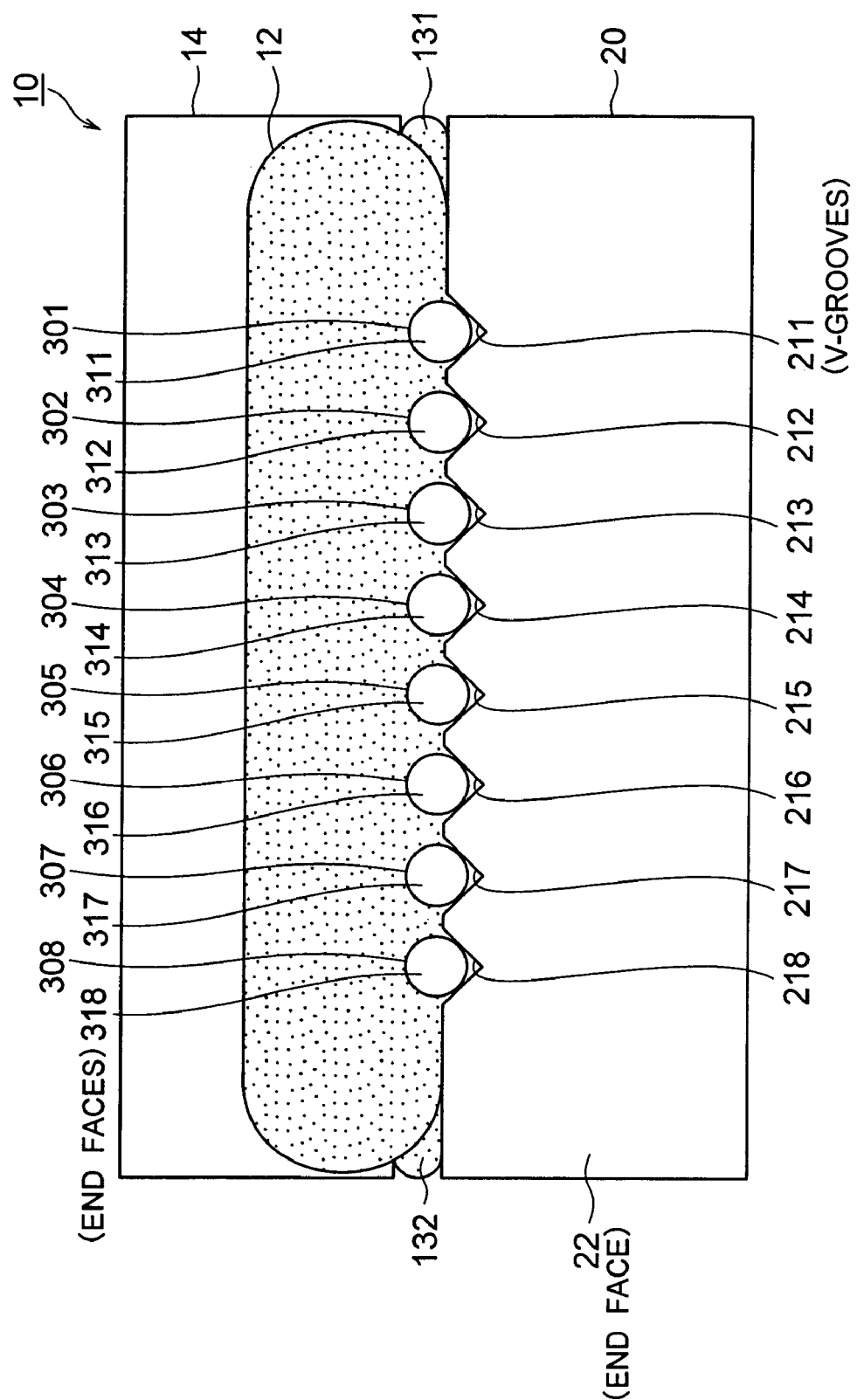
FIG. 5 is a right-side view of the optical fiber array in FIG. 4.

FIG. 4 and FIG. 5 show a first embodiment of an optical fiber array according to the present invention. FIG. 4 is a top view, FIG. 4 is a front view, and FIG. 5 is a right side view. Although an optical fiber array is used as an optical fiber component in the embodiments of the present invention given below, the optical fiber component is not limited to an optical fiber array.

An optical fiber array 10 in this embodiment comprises a V-block 20 in which a plurality of V-grooves 211-218 are formed and optical fibers 301-308 that are fit individually into the V-grooves 211-218. The optical fibers 301-308 are fit in the V-grooves 211-218 with their end faces 311-318 flush approximately with an end face 22 of the V-block 20. The end face 22 of the V-block 20, including the end faces 311-318 of the optical fibers 301-308, is shaped according to the end face of an object to which the optical fibers 301-308 are to be connected. A ground end face 11, composed of the end faces 311-318 of the optical fibers 301-308 and the end face 22 of the V-block 20, in this embodiment shown in FIG. 4 is cut and shaped perpendicular to the optical axes of the optical fibers 301-308. The parts (top side) of the optical fibers 301-308 fit into the V-grooves 211-218, but not included inside the V-grooves 211-218, are exposed outside the V-grooves 211-218.

The area of the V-grooves 211-218 are divided into two: one is an adhesive-fixing area 231 where the optical fibers 301-308 are fit and fixed by an adhesive 12 and the other is anon-adhesive-fixing area 232 where the optical fibers 301-308 are simply fit. In a part of the adhesive-fixing area 231 of the V-grooves 211-218, a concave portion 23 where the shielded optical fibers 301-308 are installed is formed. Although the V-block 20, used as a housing block, is made of a glass substrate of silica glass or borosilicate glass, a silicon substrate may also be used.

Shielded optical fibers 321-328 have their shields removed on the side of the end faces 311-318, where the cores and claddings of the optical fibers 301-308 are exposed and the exposed optical fibers 301-308 are fit into the V-grooves 211-218. A part of the shielded optical fibers 321-328 are bundled flatways, and adhesives 131 and 132 are applied to their sides. A glass block 14 is installed in the V-block 20 with the adhesives 131 and 132. Therefore, the shielded optical fibers 321-328 have both sides fixed by the adhesives 131 and 132 and are held between the glass block 14 and the V-block 20. If the optical fibers 301-308 are fixed firmly into the grooves 211-218 in the adhesive-fixing area 231 simply by fixing them with the adhesive 12, the glass block 14 need not be installed.

Next, the operation and the effect of the optical fiber array 10 will be described.

The optical fibers 301-308 are housed in the V-grooves 211-218 formed in the V-block 20 with the end faces 311-318 flush with the end face 22 of the V-block 20. Thus, when the optical fibers 301-308 are connected to the optical waveguides (for example, optical waveguides 511-518 in FIG. 10), the V-grooves 211-218 prevent the end faces 311-318 of the optical fibers 301-308 from oscillating, thereby increasing alignment precision and increasing the strength of the optical fibers 301-308. The glass block 14 used in this embodiment fixes a part of the shielded optical fibers 321-328, further increasing the strength of the optical fibers 301-308.

If all part of the optical fibers 301-308 is fixed in the V-grooves 211-218 with the adhesive 12, some adhesive 12 running off from the V-grooves 211-218 could sometimes prevent the optical fiber array 10 from being properly installed in the V-groove (not shown) in the optical waveguide substrate. In contrast, because only a part of the optical fibers 301-308 is fixed in the V-grooves 211-218 with the adhesive 12 in this embodiment, such a condition does not occur.

Figure 7:
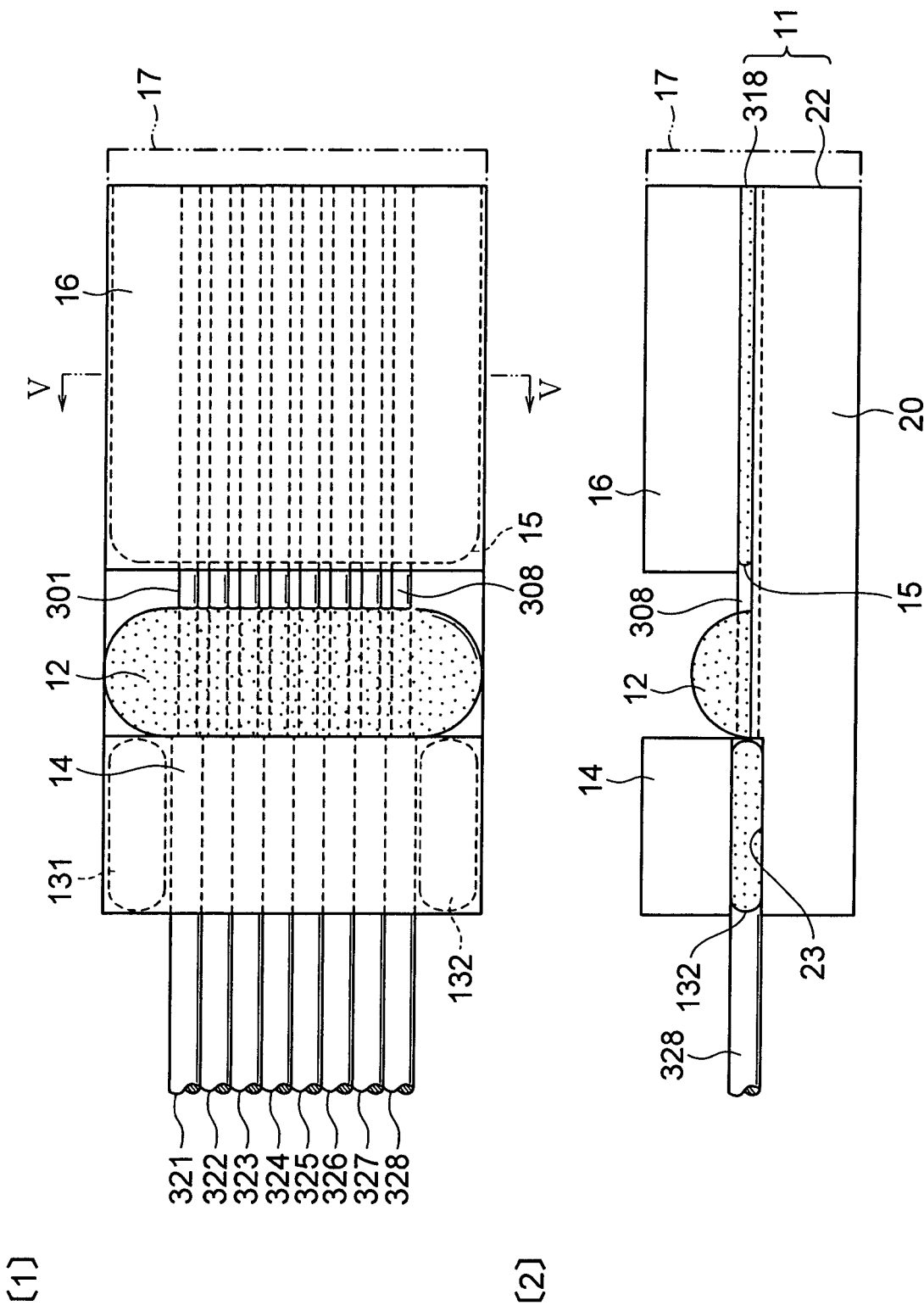
FIG. 7 is a diagram showing a part of the manufacturing process of the optical fiber array.

FIG. 6 is a front view of the optical fiber array 10 during the manufacturing process. The process proceeds in order of FIG. 6 to FIG. 6. FIG. 7 is a diagram showing a part of the manufacturing process of the optical fiber array 10, FIG. 7 is a top view, and FIG. 7 is a front view. FIG. 8 is a schematic cross section diagram taken on line V-V in FIG. 7. With reference to FIGS. 4 to 8, the following describes the manufacturing method of the optical fiber array 10. Note that, in FIG. 7, the same reference numerals as those in FIG. 4 denote the same structural elements and their descriptions are omitted.

First, the rectangular solid V-block 20 is prepared, and the V-grooves 211-218 are formed on the V-block 20 (FIG. 6). The V-block 20, if made of a glass substrate, is ground with a rotary blade. Then, the concave portion 23, in which shielded optical fibers 321-328 are to be placed, is formed in the V-block 20 through end milling (FIG. 6). If the V-block 20 is a silicon substrate, the V-grooves 211-218 are formed through anisotropic etching. The process in FIG. 6 and the process in FIG. 6 may be carried out in any order.

The shield of the shielded optical fibers 321-328 on the side of the end faces 311-318 is removed to expose the optical fibers 301-308, and the tips of the optical fibers 301-308 are cut uniformly with a fiber array cutter. However, a commercially available fiber array cutter would produce variations in length in the range of about ±15 to 20 µm. Those variations would result in a gap in the optical axis direction between the end faces of the optical fibers 301-308 and the end face of the optical waveguide (not shown), and this gap, in turn, would generate a coupling loss of 0.15-0.25 dB. To solve this problem, the following grinding process is applied.

Next, the shielded optical fibers 321-328 are installed in the concave portion 23 and, at the same time, the optical fibers 301-308 are fit into the V-grooves 211-218 (FIG. 6). Then, with a grinding block 16 of a glass substrate pushing onto the optical fibers 301-308 on the end face 311-318 side while taking care not to oscillate the optical fibers 321-328, the grinding block 16 is pasted with a wax 15 (FIG. 6). The wax 15 used in this process is a wax that can be removed by heating or with an organic solvent. The grinding block 16 may be the one that pushes the plurality of optical fibers 301-308 with its bottom (FIG. 6), may be the one that pushes the optical fibers 301-308 with the V-grooves 161 individually into the V-grooves (FIG. 8), or may be the one that pushes the plurality of optical fibers 301-308 with the internal surface of a concave portion 162 (FIG. 8).

The plurality of shielded optical fibers 321-328 are bundled flatways, and the bundled optical fibers 321-328 are installed in the concave portion 23. The adhesives 131 and 132 are applied to the concave portion 23 at the both sides of the bundled optical fibers 321-328, and the glass block 14 is pasted on the adhesives 131 and 132. Then, by pushing the optical fibers 321-328 with the glass block 14, the shielded optical fibers 321-328 are held between the glass block 14 and the V-block 20 (FIG. 6). At this time, care must be taken to push the glass block 14 to prevent micro bending from being generated near the boundary between the claddings and the cores of the shielded optical fibers 321-328. The process in FIG. 6 and the process in FIG. 6 may be carried out in any order. Although applied only on the both sides of the shielded optical fibers 321-328 as shown in FIG. 7, the adhesives 131 and 132 may be applied all over the shielded optical fibers 321-328 to further increase the strength.

After that, the V-block 20 in which the optical fibers 301-308 are housed, as well as the grinding block 16, are ground to form the ground end face 11 (FIG. 7). The shape before grinding is shown by a chain double-dashed line 17. At this time, if it is difficult to select the wax 15 that can be completely removed by heating or with an organic solvent, the optical fibers 301-308 can be physically held through pressure fixing without using a wax. The ground end face 11 may be ground flat or may be ground obliquely to prevent reflection (see ground face end 11' in FIG. 6).

Finally, the wax 15 is peeled to remove the grinding block 16 from the V-block 20 to complete the optical fiber array 10 shown in FIG. 4. The optical fiber array 10, if physically held through pressure fixing without using the wax 15, can of course be removed easily. Because the grinding block 16 is finally removed, it can be reused. As shown in FIG. 4, FIG. 5, and FIG. 7, it is also possible to fix a part of the optical fibers 301-308 in the V-grooves 211-218 with the adhesive 12 by applying the adhesive 12 over the optical fibers 301-308 in the V-grooves 211-218 that are near the glass block 14.

Figure 9:
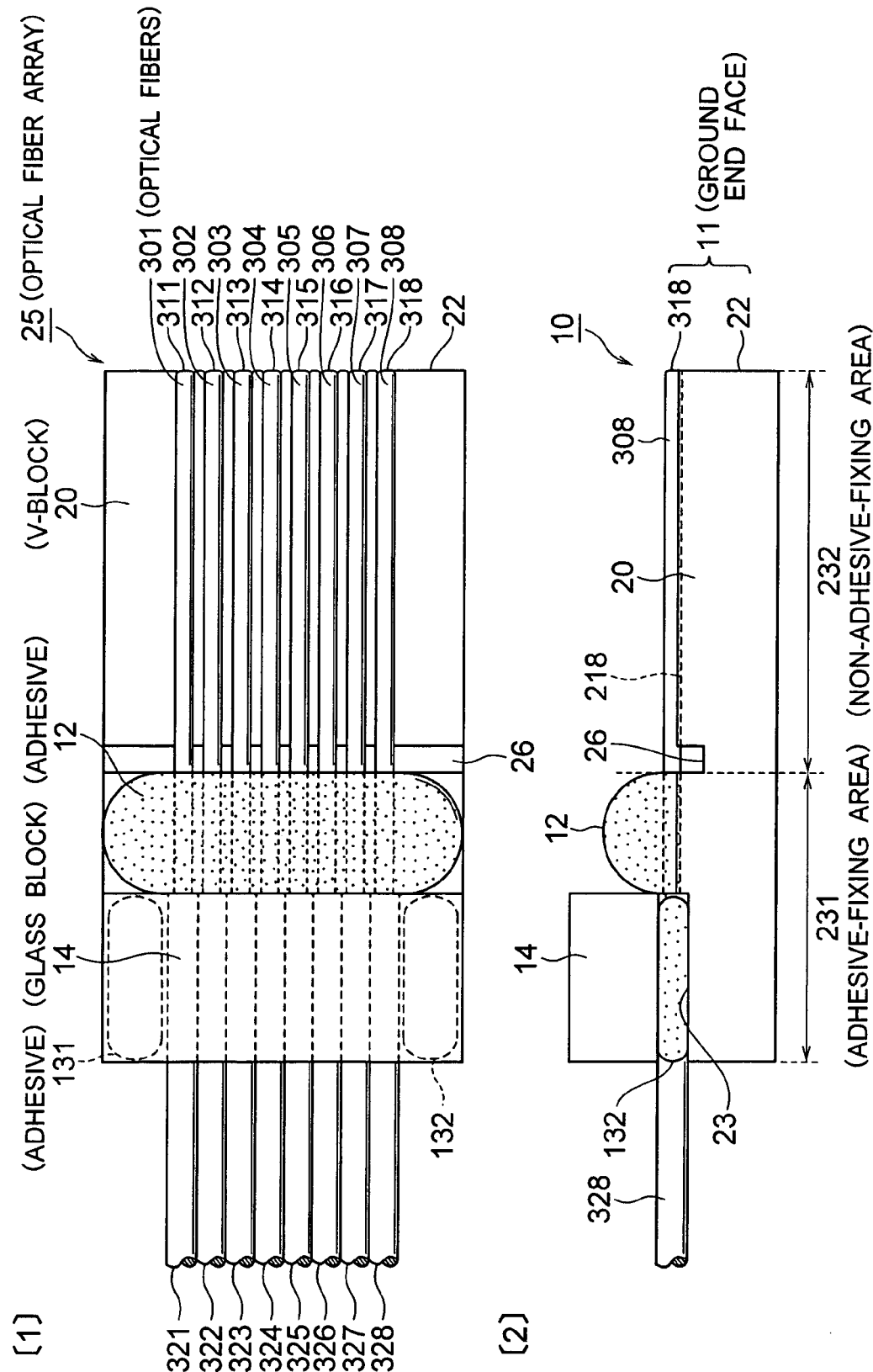
FIG. 9 is a diagram showing a second embodiment of an optical fiber array according to the present invention.

FIG. 9 shows a second embodiment of an optical fiber array according to the present invention, FIG. 9 is a top view, and FIG. 9 is a front view. With reference to the drawings, the following describes the second embodiment. Note that the same reference numerals as those in FIG. 4 denote the same structural elements and their descriptions are omitted.

An optical fiber array 25 in this embodiment has a concave portion 26, which functions as a pool, at the boundary between the adhesive-fixing area 231 and the non-adhesive-fixing area 232 on a V-block 20. The concave portion 26 functions as adhesive blocking unit that blocks extra adhesive 12 in the adhesive-fixing area 231 from flowing into the non-adhesive-fixing area 232.

Because the adhesive 12 in the adhesive-fixing area 231 remains a liquid or a fluid until it solidifies, the adhesive 12 tends to flow into the non-adhesive-fixing area 232 via the gap between the optical fibers 301-308 and the V-grooves 211-218 by the capillary phenomenon. The adhesive 12 that flows into the non-adhesive-fixing area 232 overflows from the V-grooves 211-218 to block the optical fiber array 25 from being installed properly in the guide grooves of an optical waveguide substrate (not shown). This is an undesirable condition.

To solve this problem, in this embodiment, the concave portion 26 is formed in the V-block 20 to provide a space large enough to prevent the capillary phenomenon. This embodiment is especially effective when the adhesive 12 that is used has a small contact angle with respect to the optical fibers 301-308 and the V-grooves 211-218 and has a low viscosity.

Figure 11:
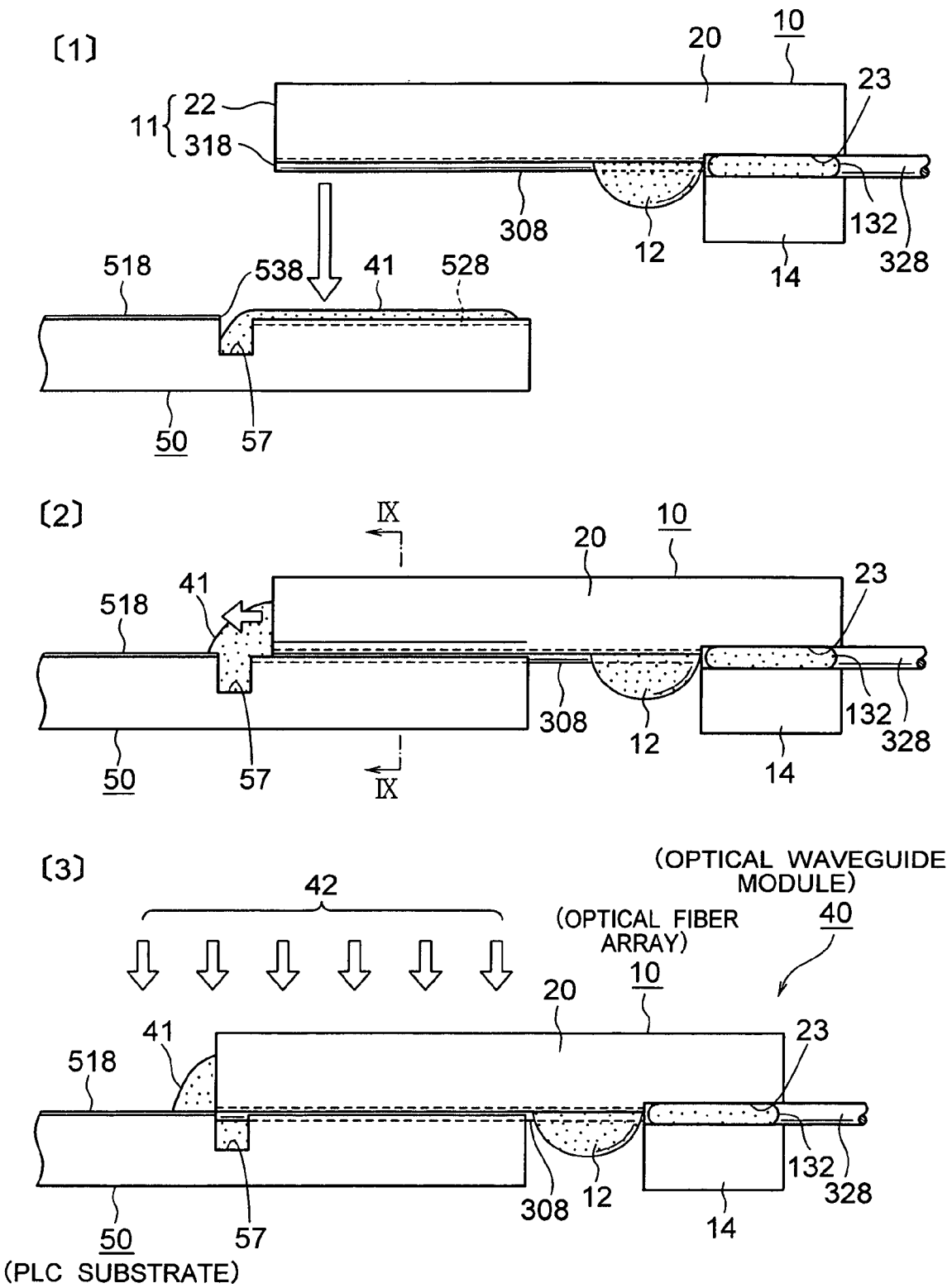
FIG. 11 is a front view of the optical waveguide module in the first embodiment of the present invention during manufacturing with the process proceeding from FIG. 11 to FIG. 11.
Figure 12:
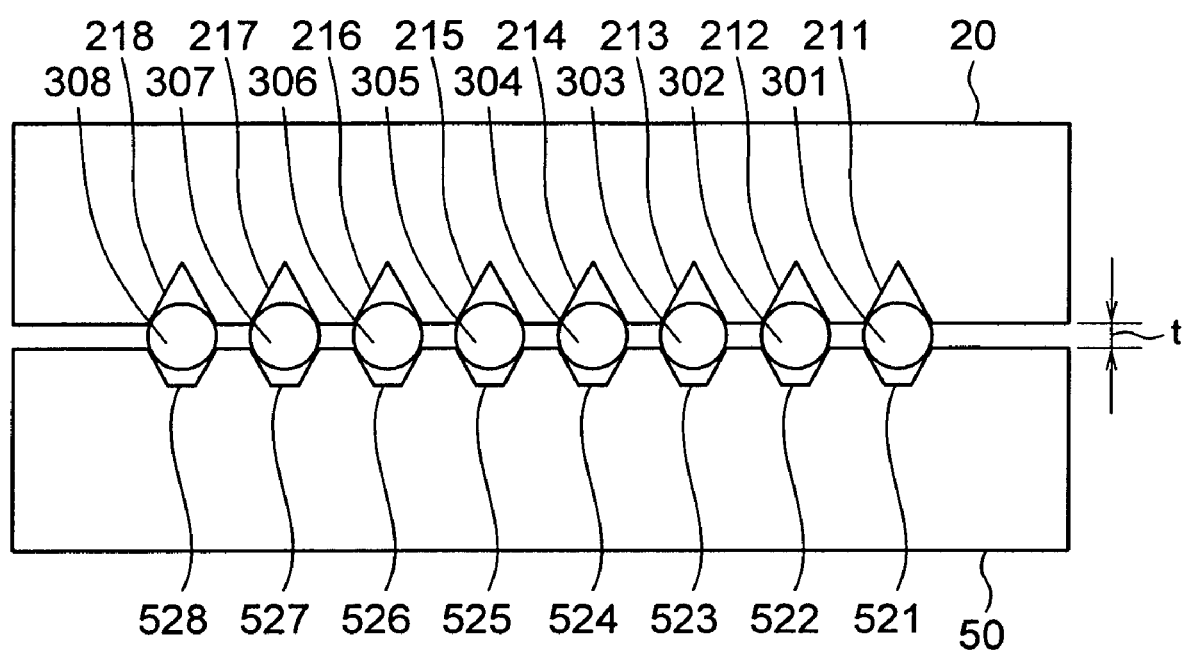
FIG. 12 is a schematic cross section diagram taken on line IX-IX in FIG. 11.
Figure 13:
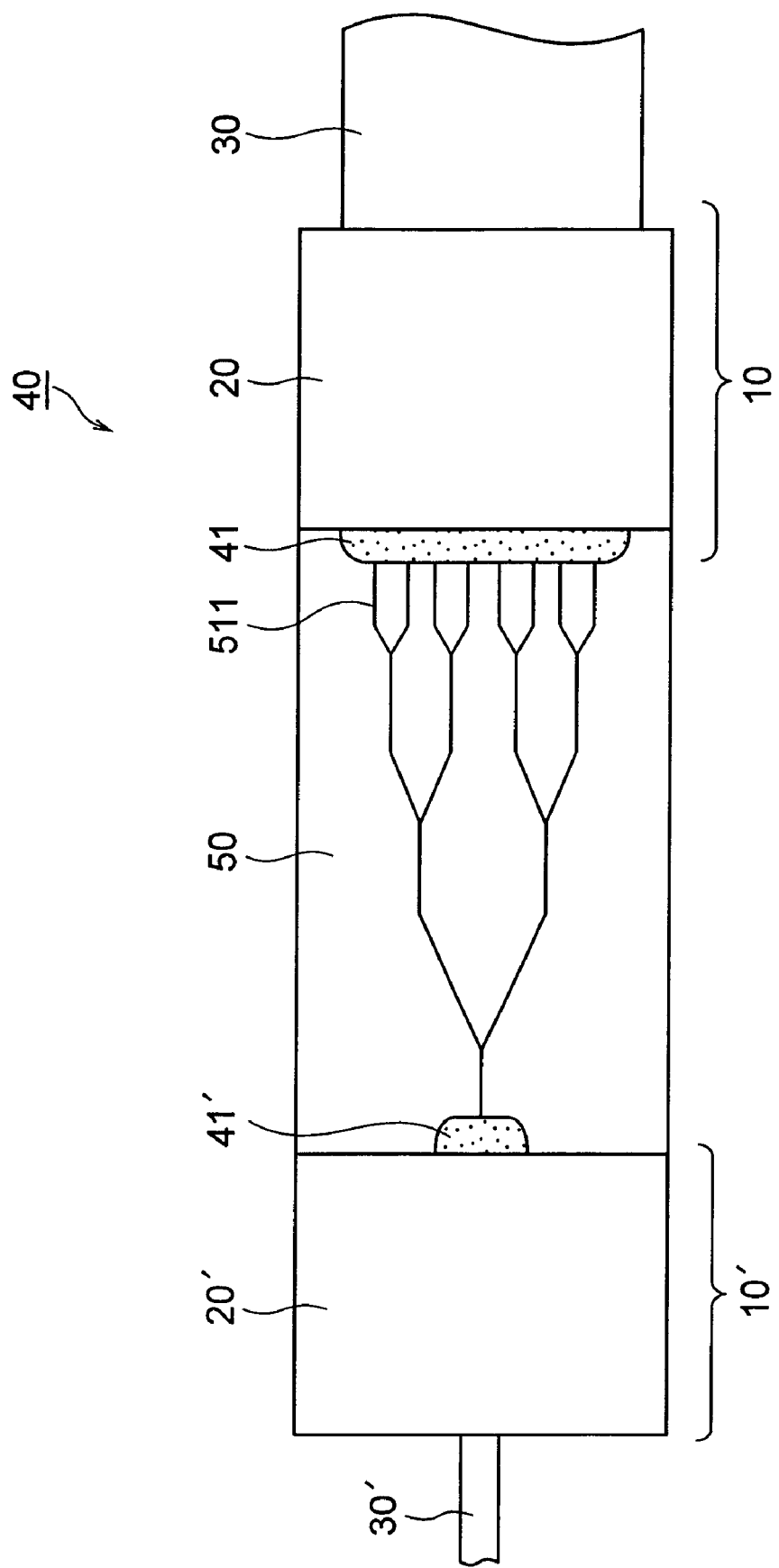
FIG. 13 is a diagram showing a top view of the first embodiment of the optical waveguide module of the present invention.

FIG. 10 to FIG. 13 are diagrams showing a first embodiment of an optical waveguide module according to the present invention. FIG. 10 shows a PLC substrate used as an optical waveguide substrate. FIG. 10 is a top view, FIG. 10 is a front view, and FIG. 10 is a right side view. FIG. 11 is a front view of the optical waveguide module during manufacturing, and the process proceeds in order of FIG. 11 to FIG. 11. FIG. 12 is a schematic cross section diagram taken on line IX-IX in FIG. 11. FIG. 13 is a top view of the optical waveguide module. The following describes this embodiment with reference to those drawings. Note that, in FIG. 11, the same reference numerals as those in FIG. 4 denote the same structural elements and their descriptions are omitted.

As shown in FIG. 11, an optical waveguide module 40 in this embodiment comprises an optical fiber array 10 and a PLC substrate 50 that are connected together, wherein optical waveguides 511-518 are formed on the PLC substrate 50. V-grooves 521-528 are formed on the PLC substrate 50, the one end of the V-grooves 521-528 is opposed to end faces 531-538 of the optical waveguides 511-518, and the other end of the V-grooves 521-528 is on an end face 54 of the PLC substrate 50. The optical fibers 301-308 are held between the V-grooves 521-528 and the V-grooves 211-218 with the end faces 311-318 of the optical fibers 301-308 opposed and joined to the end faces 531-538 of the optical waveguides 511-518. The PLC substrate 50 used in this embodiment constitutes a part of an optical splitter. An optical waveguide substrate is not limited to a PLC substrate but any other may also be used.

Because the v-grooves and the optical waveguides are formed on separate substrates in the first prior art, the optical waveguide substrate must be glued to the V-groove substrate using the alignment marks. In contrast, because the V-grooves 521-528 are also formed on the PLC substrate 50 on which the optical waveguides 511-518 are formed in this embodiment, the manufacturing process becomes simpler and the alignment precision is increased. In addition, because the optical fibers placed in the V-grooves oscillate in the V-grooves in the prior art, the alignment precision is decreased. In contrast, the optical fiber array 10 used in this embodiment suppresses the oscillation of the optical fibers 321-328 in the V-grooves 521-528 during the manufacturing process and therefore increases the alignment precision. The damage of the optical fibers 321-328 during the manufacturing process is suppressed and therefore the process yield is increased.

Next, the following describes the manufacturing method of the PLC substrate 50 with reference to FIG. 10.

Figure 1:
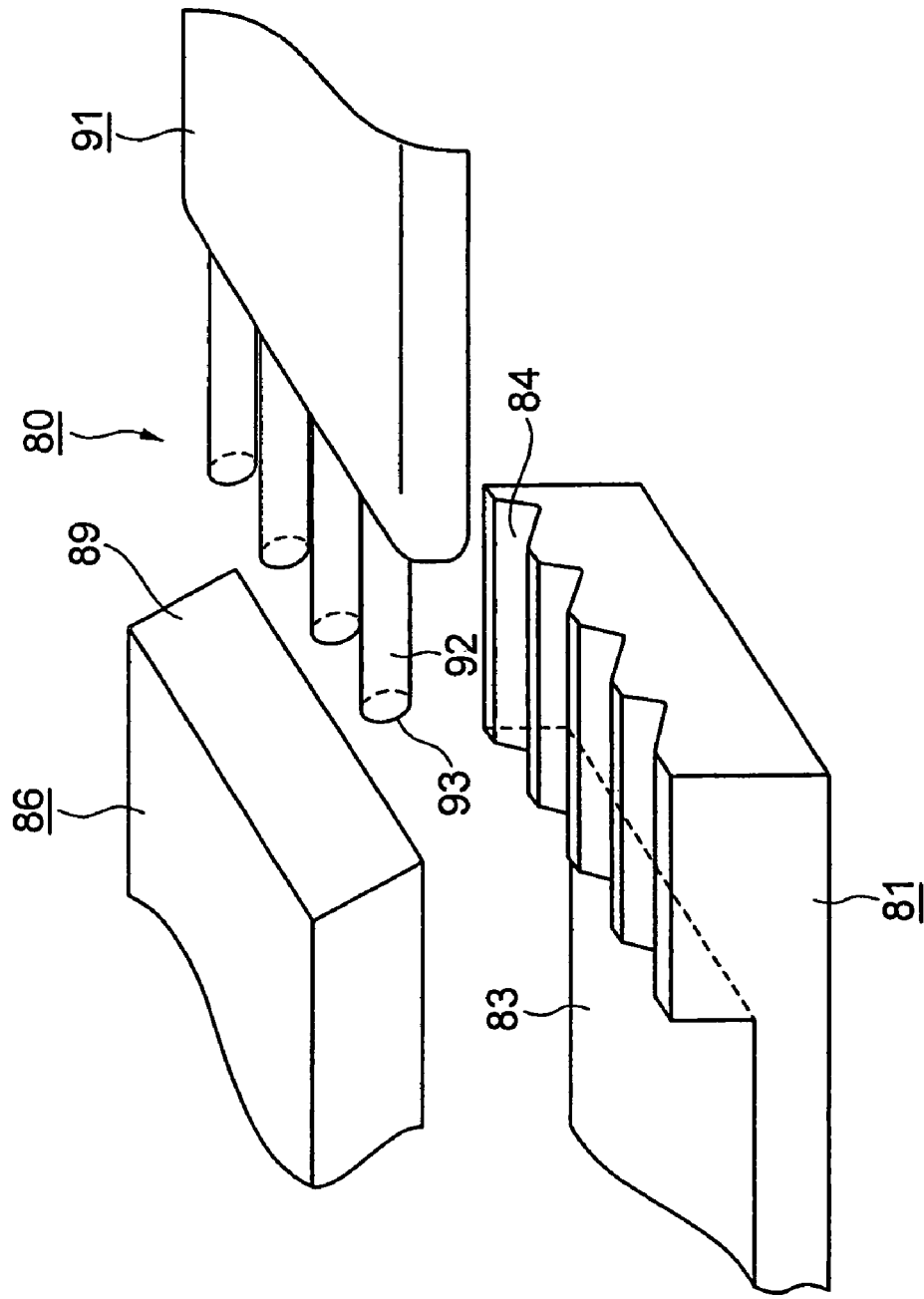
FIG. 1 is a diagram showing a perspective view of a first prior art.
Figure 2:
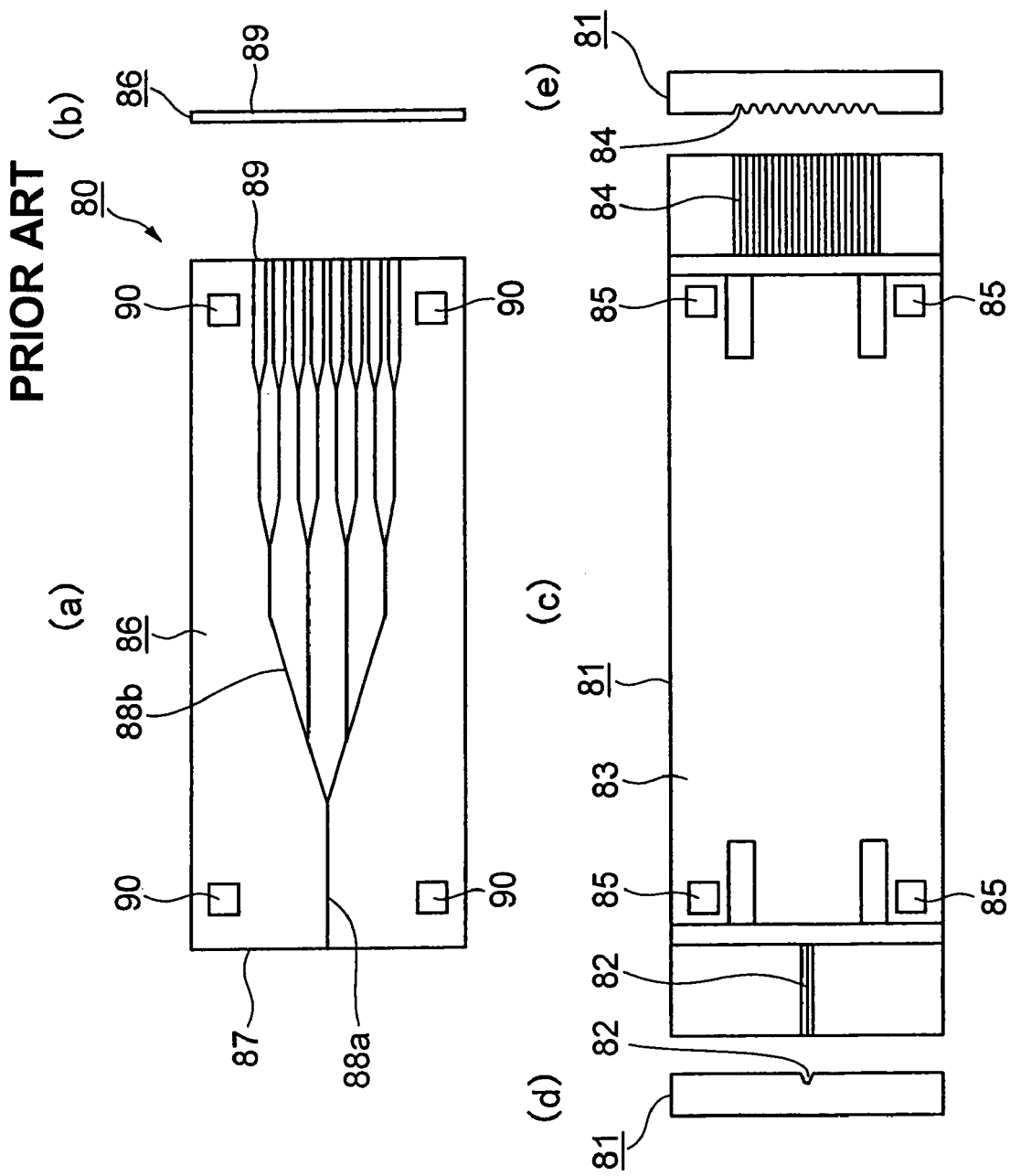
FIG. 2 is diagram showing a top view of the first prior art.
Figure 3:
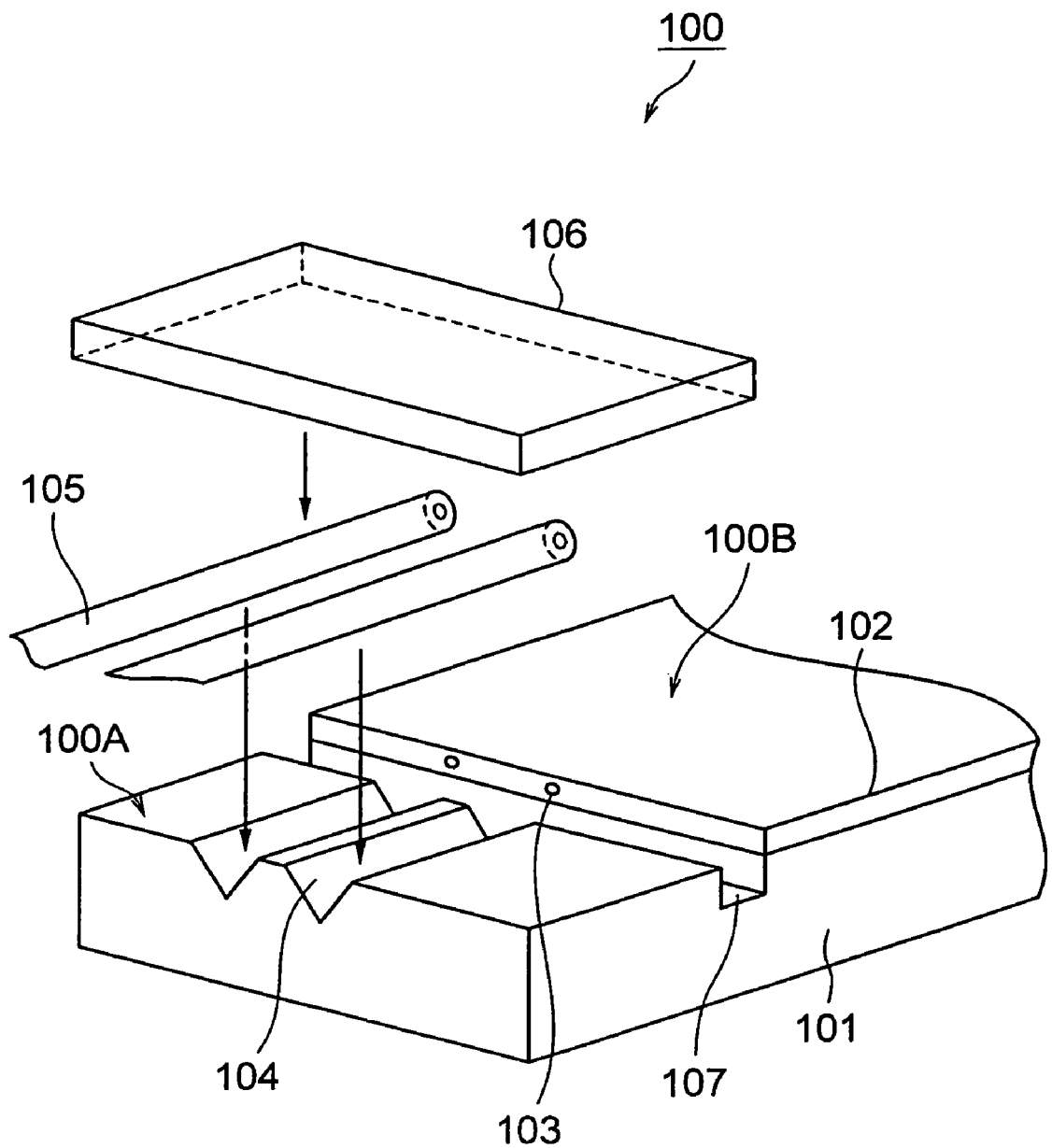
FIG. 3 is a diagram showing a perspective view of a second prior art.

First, the alignment patterns for forming the V-grooves 521-528 and the optical waveguides 511-518 are formed on a silicon substrate 55. After that, a silica glass layer 56 is formed all over the silicon substrate 55 and, through the photo lithography technology, the optical waveguides 511-518 and an optical circuit (not shown) are formed. At this time, the positions of the optical waveguides 511-518 are aligned with the positions of the V-grooves 521-528 using the alignment patterns described above. Then, the silica glass layer 56 in the area where the V-grooves 521-528 are to be created are removed through etching to expose the silicon substrate 55. After that, anisotropic etching through a KOH solution is applied to the exposed silicon substrate 55 to form the V-grooves 521-528. The spacing between each two of the V-grooves 521-528 and the number of the V-grooves 521-528 are the same as those of the V-grooves 211-218 in the V-block 20 shown in FIG. 2. Next, the silicon substrate 55 and the silica glass layer 56 at the boundary between the optical waveguides 511-518 and the V-grooves 521-528 are ground with a rotary blade to form a slit 57. Finally, the silicon substrate 55 processed as described above is cut to a desired size of chips to form the end faces 531-538 of the optical waveguides 511-518. Thus, the PLC substrate 50 having an optical waveguide array thereon is completed. It is also possible to grind the end faces 531-538 of the optical waveguides 511-518 obliquely with a slicer.

Next, with reference to FIG. 11, the following describes the manufacturing method of the optical waveguide module 40.

FIG. 11 is a diagram showing how the optical fiber array 10 is passively aligned on the PLC substrate 50 having an optical waveguide array with the V-grooves 521-528 for guiding. First, a UV photo-curing adhesive 41 is applied to the V-grooves 521-528 of the PLC substrate 50 (FIG. 11). Then, the optical fiber array 10 is installed on the PLC substrate 50 with the optical fibers 321-328 placed in the V-grooves 521-528 (FIG. 11). This causes the optical fibers 321-328 to be held between the V-grooves 521-528 and the V-grooves 211-218.

In this case, the shape of the V-grooves 211-218 of the V-block 20 and the V-grooves 521-528 of the PLC substrate 50, if designed based on a desired shape, allows the thickness t of the adhesive 41 in FIG. 12 to be adjusted easily. The gap, t in width, between the PLC substrate 50 and the V-block 20 indicates that the optical fibers 301-308 are held only by the V-grooves 521-528 and the V-grooves 211-218. At this time, because the optical fibers 301-308 do not move in the V-grooves 521-528 and the V-grooves 211-218, the positional precision of the optical fibers 301-308 is good.

Next, with the optical fiber array 10 pushed from above, the end faces 311-318 of the optical fibers 321-328 are joined to the end faces 531-538 of the optical waveguides 511-518. Finally, a UV light 42 is emitted from above the optical fiber array 10 to glue the optical fiber array 10 onto the PLC substrate 50 (FIG. 11). When the V-block 20 is made of a silicon substrate that does not pass an ultraviolet light, a hot cured adhesive is used to heat-fix the optical fiber array 10 onto the PLC substrate 50.

Thus, the ideal passive alignment between the optical fiber array 10 and the PLC substrate 50 described above realizes high-precision installation with no complicate adjustment. Therefore, this embodiment optically couples a multi-core device to some other device effectively at a low cost. In addition, the end face can be easily made oblique to eliminate the effect of Fresnel reflection.

As shown in FIG. 13, the optical waveguide module 40 in this embodiment is an optical splitter that has one optical fiber from which an optical signal is branched into eight optical fibers.

To the output side (right side in the figure) of the optical waveguide module 40, the PLC substrate 50 is optically connected to the optical fiber array 10 via the adhesive 41. To the output side of the optical fiber array 10, an optical fiber tape 30, composed of the shielded optical fibers 321-328 shielded further by polyamide synthetic fibers, UV resin, and the like, is extended.

On the other hand, to the input side (right side in the figure) of the optical waveguide module 40, the PLC substrate 50 is optically connected to an optical fiber array 10' via an adhesive 41'. The optical fiber array 10' has the configuration similar to that of the optical fiber array 10 except that there is only one optical fiber. To the input side of the optical fiber array 10', a shielded optical fiber core 30', composed of one shielded optical fiber shielded further by polyamide synthetic fibers, UV resin, and the like, is extended.

FIG. 14 is a diagram showing a front view of a second embodiment of an optical waveguide module according to the present invention and its manufacturing method. The process proceeds in order of FIG. 14 to FIG. 14. The following describes this embodiment with reference to those drawings. Note that the same reference numerals as those in FIG. 11 denote the same structural elements and their descriptions are omitted.

As shown in FIG. 14, the configuration of an optical waveguide module 60 in this embodiment is similar to that of the optical waveguide module 40 in the first embodiment except that an abutment block 61 is added. This abutment block 61 is provided on the PLC substrate 50 and has an abutment face 62 that is flush with the end faces 531-538 of the optical waveguides 511-518. The abutment block 61, made of a glass substrate or a silicon substrate, is fixed on the PLC substrate 50 with an adhesive, for example, and the abutment face 62 is formed at the same time the slit 57 is formed. The end faces 311-318 of the optical fibers 301-308 and the end face 22 of the V-block 20 are pasted to the end faces 531-538 of the optical waveguides 511-518 and the abutment face 62 of the abutment block 61 with the adhesive 41 that is too thin to be indicated in the figure.

According to this embodiment, the end faces 311-318 of the optical fibers 301-308 and the end face 22 of the V-block 20 are joined not only to the end faces 531-538 of the optical waveguides 511-518 but also to the abutment face 62 of the abutment block 61 to increase the intensity. That is, this structure increases the robustness of the optical waveguide module 60.

The present invention is applicable to a multi-core fiber as well as to a single-core fiber (for example, the optical fiber array 10' shown in FIG. 13). In this case, an obliquely ground single-core fiber can be installed without carrying out alignment between the end faces of optical fibers and the end face of an optical waveguide which is a problem with the installation of an obliquely ground single-core fiber. Instead of V-grooves, grooves of any cross section shape such as U-shaped, semicircular, or rectangular grooves may also be used.

What is claimed is:

1. An optical waveguide module comprising:
 an optical fiber component comprising a housing block having a groove on a surface thereof and an optical fiber fixed onto said housing block, in which an end face of said optical fiber and an end face of said housing block are in approximately the same plane, the housing block having a collecting portion which collects excess adhesive within an adhesive-fixing area of said housing block, the collecting portion having a concave lower surface such that the collection portion has a semicircular shape in cross section, an optical waveguide substrate having optical waveguides thereon, wherein guiding grooves are formed on said optical waveguide substrate, one of ends of said guiding grooves are opposed to end faces of said optical waveguides, and the other ends of said guiding grooves are on an end face of said optical waveguide substrate, wherein a bottom surface of said optical fiber is supported by said groove of said housing block, and a top surface of said optical fiber being opposite to said bottom surface of said optical fiber in which said top surface of said optical fiber is exposed from said groove, wherein the top surface of said optical fiber is fixed onto said housing block with an adhesive in the adhesive-fixing area of said housing block, and the bottom surface of said optical fiber is supported by said groove in a non-adhesive-fixing area of said housing block, and wherein the top surface of said optical fiber in the non-adhesive fixing area of said housing block is supported by said guiding grooves of said optical waveguide substrate.

2. The optical waveguide module according to claim 1, further comprising an abutment block that is provided on said optical waveguide substrate and has an abutment plane in the same plane as that of the end faces of said optical waveguides, wherein the abutment plane is defined on a side surface of said abutment block in contact with the end faces of said optical waveguide, and wherein said optical fiber is fixed in a state that the end face of said optical fiber and an end face of said housing block are joined to the end faces of said optical waveguides and the abutment face of said abutment block.

3. The optical waveguide module according to claim 1, wherein said groove has a triangular shape with two outer surfaces, and wherein said guiding grooves have a substantially rectangular shape with three outer surfaces.

4. The optical waveguide module according to claim 1, wherein the collecting portion has a curved lower surface for collecting and holding in place the excess adhesive.

5. The optical waveguide module according to claim 1, wherein said collecting portion is formed across an entire width of said housing block so as to form a concave-shaped trench.

6. The optical waveguide module according to claim 1, wherein an end face of said optical fiber and an end face of said housing block are in approximately the same plane, the same plane being tilted with respect to an optical axis of said optical fiber so as not to be perpendicular to the optical axis of said optical fiber.

7. The optical waveguide module according to claim 1,
wherein a gap having a prescribed width is generated between the housing block and the optical waveguide substrate.

8. The optical waveguide module according to claim 1,
wherein the end face of the housing block and the end face of the optical fiber opposed to the end faces of the waveguides are oblique to an optical axis of the optical fiber.

9. The optical waveguide module according to claim 8, wherein reflection is prevented by having the end face of the housing block and the end face of the optical fiber opposed to the end faces of the waveguides being oblique to the optical axis of the optical fiber.

10. The optical waveguide module according to claim 1, wherein glue is not utilized to adhere the optical fiber to said housing block.

* * * * *